April 16, 1963
F. H. SNYDER
3,085,926
HYDROPYROLYSIS OF WOODY MATERIALS TO FORM THERMOSETTING COMPOUNDS
Filed Sept. 14, 1959
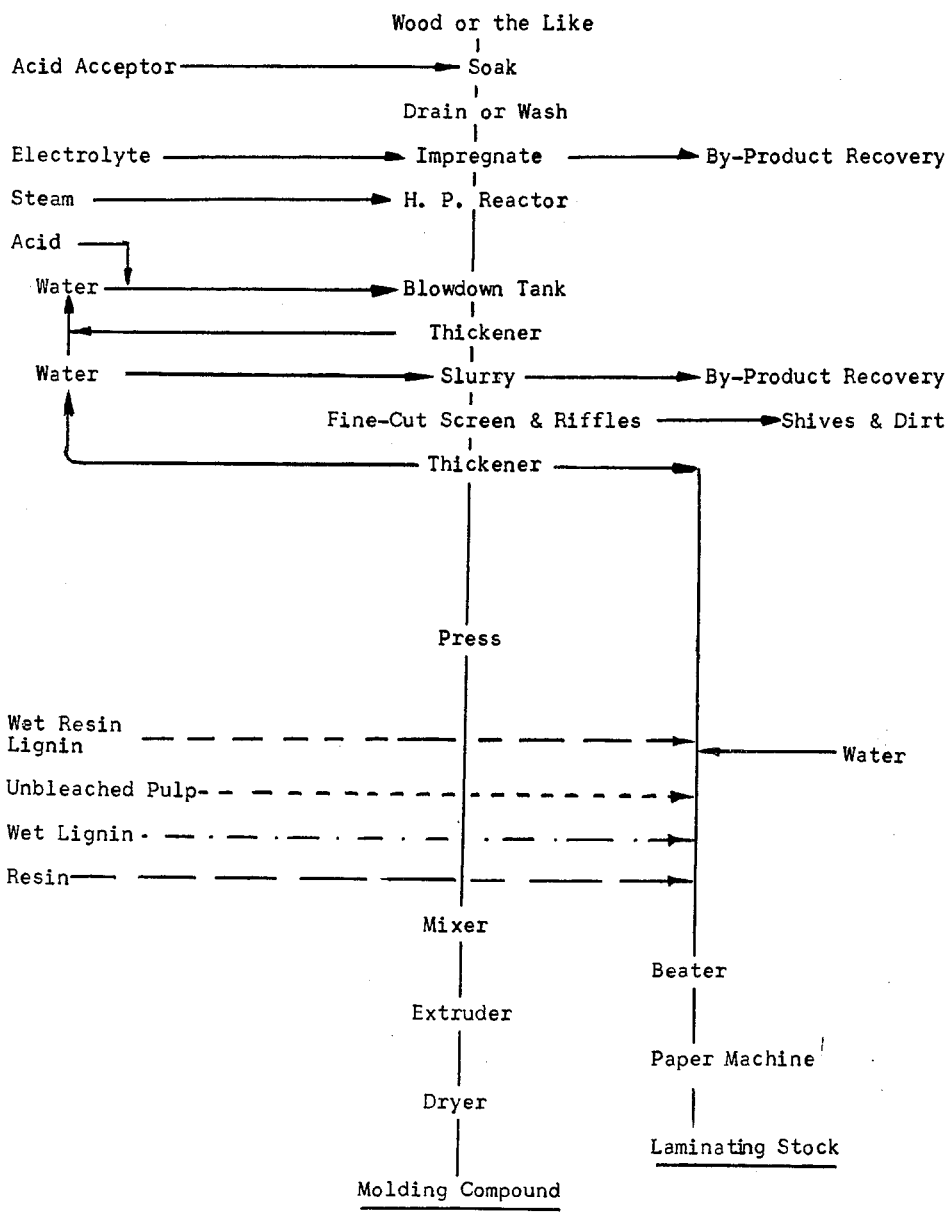
Inventor
FRANCIS H. SNYDER
By Parker and Walsh
Attorney

United States Patent Office 3,085,926
Patented Apr. 16, 1963

3,085,926
HYDROPYROLYSIS OF WOODY MATERIALS TO FORM THERMOSETTING COMPOUNDS
Francis H. Snyder, Newtown, Conn.
(Box 357, New Milford, Conn.)
Filed Sept. 14, 1959, Ser. No. 839,829
16 Claims. (Cl. 162—21)

This invention relates to the hydropyrolysis of wood to produce products useful in phenolic molding compounds, laminating stocks and related products.

Phenolic molding compounds of commerce are formed of phenolic resins, filler and small amounts of such agents as color, lubricant and curing agents. Some inorganic fillers such as aluminum silicate and asbestos are used. Much more extensive use is made of lignocellulose materials such as wood and shell flour. Laminating stocks employ sheeted fibers, again usually wood-derived, saturated with phenolic resins.

Since the phenolic resin is relatively more expensive than the filler, efforts to reduce the cost of molding compounds and the like, have centered on the partial or total replacement of the resin with a cheaper material. For the most part, such substitutions have resulted in such losses of quality as to substantially offset the saving in cost.

Many efforts have been made to derive resin extenders from lignin. The incentives are powerful. Large amounts of lignin compounds are available both as by-products of paper manufacture and directly from wood. Although the chemical structure of lignin is still undetermined, enough is known to conclude that there are such similarities between its structure and that of the usual phenolic constituents of resins as to suggest generally satisfactory compatibility. Since lignin is associated with cellulosic substances in nature, there is the added prospect of economies resulting from the combined recovery of both resin and filler from the same raw material source. In spite of many efforts in this direction, at the present time no significant commercial production has resulted from all of this work.

This application is a continuation-in-part of my application Serial No. 594,432, filed June 28, 1956, now abandoned.

My prior application was directed to the production of wood pulp suitable for paper making or as fibrous reinforcement of molding compounds with collateral production of degraded lignin suitable for inclusion in molding compounds. I have now found that, by modifying the operating conditions of my process, an increased amount of lignin and allied substances can be obtained with only a moderate loss of fiber. Such fiber is quite suitable for incorporation into molding compounds although it is materially less desirable for paper making purposes. Whereas paper making processes normally recover about 40 to 55 percent of the wood as fiber, with little economic recovery of the remaining wood substance my process aims to produce much larger total recovery of the wood with the entire product having substantial economic utility.

Also, because it is especially useful when applied to hard woods, it may be operated in conjunction with a lumbering operation to make use of the waste material produced by the lumbering operation to further effect economies by joint operation.

By hydropyrolysis is meant the treatment of wood with saturated steam at elevated pressures and at temperatures which would result in the exothermic pyrolysis of the wood if the water vapor were not present. The presence of the moisture modifies the pyrolytic reaction so that the equilibrium conditions are changed and pyrolysis in the usual sense does not take place. My process is limited, therefore, to the employment of hydropyrolysis at elevated pressures, generally the pressure approximately equivalent to that of water vapor at the temperature employed and, in addition, it makes use of simple catalysts as more fully disclosed in this specification. The products produced indicate drastic changes in the wood although not of such far reaching character as conventional pyrolysis, that is to say substantially all of the products are liquid and solid with only insignificant amounts of fixed gases. It should also be pointed out that the term wood as used herein refers to any ligno-cellulose material and not to the product of tree growth only.

More specifically, my invention contemplates the treatment of woody material with dry, saturated steam in the presence of small amounts of catalytic agents and in the substantial absence of a liquid phase at temperatures of the order of 250 to 300° C. (corresponding approximately to pressures of 600 to 1250 p.s.i.) for relatively short periods of time in the order of seconds to a few minutes. As may be expected, the time of treatment at any given temperature is relatively less than that prevailing at a higher temperature. At the end of the high temperature treatment, the pressure is abruptly reduced to a lower, non-reactive pressure. The aqueous liquid product is separated from the more solid resinous material remaining for separate treatment. The solids are washed, screened to remove incompletely reacted wood and subjected to a variety of further treatment to fit the resulting products for the various uses to which they may be put.

A number of processes have been previously suggested, having one or more reaction conditions more or less similar to those disclosed herein but it is notable that none of these processes are in extensive use today. I believe that the selection of reaction conditions that I have determined upon, make possible a substantially total recovery of the constituents of the wood. In the course of my specification I shall point out the various critical relationships that I consider will be essential to the carrying out of my process, whereby said process is distinguished from prior processes.

The process is illustrated by the attached flow chart drawing.

Initially, I prefer to reduce the woody material to suitable size so that it can be easily reacted upon. Wood chips, approximately ¾ to 1¼ inches in flat dimensions by ⅛ to ⅜ inch thick are well suited for starting material. For uniformity of product, complete penetration of the wood by the treating reagents is obviously necessary. Penetration is usually more effective if the wood is already moist and, in this respect, treatment of green wood may actually be more advantageous.

It may be desirable to next treat the wood with a quantity of basic substance, which may more accurately be called an acid acceptor. For reasons of economy, such materials are limited principally to the hydroxides and carbonates of the alkali (including ammonia) and alkali earth metals but it will be apparent that other acid acceptors would be usable if available at sufficiently low cost. The optimum combination of cheapness and activity under present-day conditions is a slurry of calcium hydroxide containing about 7.5 percent of reagent. The chips may be immersed in such a liquid slurry for an extended period, say 24 hours at ordinary temperature or it may be more convenient to mechanically work the liquid into the chips such as by stirring the chips in a vat or by passing them between a pair of squeeze rollers immersed in the liquid. At elevated temperatures, the time may be reduced to an hour or less.

It will be obvious that the loss in weight of the wood will significantly depend upon the variety of wood treated. The treatment results in the removal of water soluble constituents of the wood such as tannins, acetic acid, hemicellulose and the like. The loss in weight on a dry wood basis in the case of red oak may amount to 15 to 18 percent.

Red oak is relatively richer in acidic constituents than most woods. Therefore, to obtain comparable results with woods other than red oak differing amounts, usually less, of acid acceptor will be used.

The pretreated chips may be simply drained or washed and drained for the next treatment, the choice, in some measure, being dictated by the type of catalyst employed in the following step. The liquid removed from the chips may be recycled with the addition of more base material or sent to by-product recovery or both. Acetic acid may be recovered in yields varying from 80 to 150 lbs. per ton DWS, depending on the wood species.

As pointed out, some woods contain significant amounts of relatively available acid substances. In addition, it has been found that other acidic materials are released during the hydropyrolysis reaction. The pH level prevailing during the reaction influences the fiber quality of the cellulosic fraction of the wood. If the pH level ranges from about 5.5 upwardly during the reaction, dropping about 0.5 by the end, the fibrous nature of the cellulose will be largely preserved, an advantage in the production of laminating stocks. By operating downwardly of pH 5.5 to 5.0 or 4.5, the fibrous character is increasingly lost, making the product more suitable for molding composition where the longer fibers impede flow of the compound in the mold. Hence, the use of an acid acceptor depends upon the species of wood being treated and upon the uses of the end products.

The wood is next impregnated with a suitable amount of electrolyte serving as a catalyst. Again the amount of catalyst is governed in some measure by the variety of wood treated and, in addition its amount depends upon the particular product being emphasized among the various end products available from the process. If an acid catalyst such as sulphuric acid is used, from 6 to 15 pounds per ton of dry wood treated is sufficient. An increase to 25 pounds will increase the yield of liquid constituents of the reaction. Larger amounts of acid will be required in treating woods with a high ash residue than is the case where there is a low mineral content in the wood.

If the catalyst is sodium hydroxide, from 10 to 15 pounds per ton of dry wood may be used. An increase in the amount of alkali to five times this amount will serve to substantially protect all of the cellulose against degradation, so that it may be recovered in the form of fiber.

The electrolyte may also take the form of a neutral salt formed from a strong acid and a strong base, such as sodium sulphate, in amounts such as 15 to 30 pounds per ton of dry wood. The electrolyte may be conveniently defined as one which at 0.1 normality, is at least .01 ionized. In order to assure uniformity of saturation of the wood, the reagent composition should be adjusted with respect to the moisture of the wood so that the desired quantity of reagent solution will just be taken up by the wood. In the alternative, the reagent solution can be used in excess and the amount taken up calculated. This may be somewhat more difficult since the reagent is preferentially taken up by the wood, leaving a more dilute solution behind.

Where the electrolyte used is neutral or alkaline, it is possible to eliminate the preliminary treatment with acid acceptor by incorporating a suitable amount of acid acceptor with the electrolyte. For example, a single quantity of sodium hydroxide solution may be put upon the chips without further removal of the by-products. Also a mixture of approximately one part of sodium hydroxide with two parts of calcium hydroxide may be used but sufficient material of whatever character must be employed to provide both functions. Similarly, if the electrolyte used is acidic, the preliminary treatment with acid acceptor may be omitted since additional acid will be put upon the chips.

From the foregoing, it may also be concluded that, in certain combinations of circumstances, the acid constituents of the wood and the ash-forming constituents will be balanced with the desired end product so that no added catalyst will be required. So long as it is recognized that proper control of reaction conditions is needed to assure the desired nature of the end product, the manner of obtaining electrolyte balance is subordinate.

The moist impregnated chips are now ready to be charged to a high pressure reactor. Such reactor may be any suitable chamber capable of withstanding pressures in excess of 1500 pounds p.s.i., equipped with a charging door, a steam inlet and a quick-opening outlet. As the chamber is intended to be operated continuously at high temperatures, it is best that it be covered with a thick layer of insulation.

As stated, it is desirable that the reaction chamber be maintained in heated condition continuously to minimize condensation. Operating upon red oak chips soaked in sodium hydroxide solution, desirable results have been obtained by the use of dry, saturated steam at 1000 pounds' pressure. About 20 seconds is required to introduce the steam and the holding time is 70 seconds. Although the optimum conditions are variable according to the wood species being treated and according to the character of product sought, it will be obvious that it is necessary to time the reaction quite precisely when it is pointed out that 285° C. (equivalent to 1000 p.s.i.) is above the temperature at which thermal-decomposition of wood becomes exothermic. At temperatures below 250° C., the reaction period is so long with most species of wood that undesirable side reactions dominate while above 300° C. it is difficult to time the few seconds of the reaction with sufficient nicety. In order to bring the reaction to a precise end, the reaction chamber is discharged by means of a quick-opening valve into a body of water, or into an evacuated receiver.

The presence of water-soluble salts, either intentionally added or derived from the ash content of the wood, is undesirable in the finished thermosetting composition. Also, since the lignin is extensively depolymerized as a result of the high pressure reaction, it is appreciably soluble in water at this point, even though the liquid resulting from the reaction has a resultant pH in the range of 4.2 to 6.0. If the reaction conditions have been manipulated to produce a liquid product toward the neutral end of this range, a small amount of acid should be added at this point if it is desired to secure maximum recovery of the lignin with the solid portion of the reaction product.

The entire product, liquid and semi-solid is removed to a suitable washing device. It may be convenient to dilute the hydro-pyrolysis product to a pumpable slurry by the addition of water, thereby facilitating handling. The more fibrous, alkaline catalyzed reaction products filter well, permitting the use of filter washing. The product obtained with the use of the more acid catalysts tends to be non-filterable. The use of a thickener wherein the solid matter is washed by displacement, using relatively little water, is appropriate for removing salts from non-filterable reaction products.

The liquid recovered from filtering or the thickening operation will carry about eight percent of the original starting material or as much as 25 percent if the preliminary treatment with an acid acceptor has been omitted. It contains valuable by-products including furfural and hydroxymethylfurfural, which may be recovered therefrom.

At this point, it is desirable to pass the slurry through a fine cut screen and over a series of riffles or centrifugal dirt separators in manners conventional in the paper making industry. Such an operation is helpful in removing shives, metal particles, grit and dirt encountered in the process.

At this point, the lignin content of the wood is associated with a varying amount of cellulose fiber, according to the drasticness of the high pressure reaction. Depending upon the method of analysis used and upon the species of wood, the lignin content of various woods varies from approximately 15 to 35 percent. On a single species of wood, variations in the standard method of analysis account for as much as 5 percent variation.

The lignin-bearing pulp after screening and thickening, may be further reduced in moisture content, as by pressing. For many applications where the lignin content is of particular value, it is inadvisable to reduce the moisture content appreciably below 30 percent of the mass. It is well known that lignin is highly subject to the action of oxygen, especially at temperatures about 50° C. The chemistry of lignin has been widely explored but the chemical composition of lignin is still unknown. From the behavior of the lignin produced by my process, I conclude that it is the presence of substantial moisture that appears to restrain the oxidation. Also, it is useful as a lubricant in further processing.

Phenolic resin molding powders, as commercially produced, contain approximately 50 percent filler, most commonly wood flour. The incorporation of such wood flour into phenolic molding compositions is accomplished at considerable expense of energy and effort. The phenolic character of lignin has long been known and numerous attempts have been hitherto made to replace phenolic resins with lignin, usually with indifferent success. I have found that the lignin produced by my process can be used to replace up to 80 percent of phenolic resin in molding compositions so that a typical molding powder would contain:

| | Percent |
|---|---|
| Phenolic resin | 10–45 |
| Lignin | 40–5 |
| Wood fiber | 50 |

The great advantage of molding powder produced in accordance with my process is that I am able to use for the wood fiber content of the molding powder, the cellulose fibers contained in the solid portion of my high pressure reaction product. These come already blended with the lignin product so that it is only necessary to add to the blend, the requisite amount of phenolic resin together with my desired mold lubricant, coloring materials and other conventional constituents of molding powders.

In the production of molding powder, employment of the shorter-fibered hydropyrolysis products is more advantageous since the flow characteristics of the molding powder are better. For this end use, hydropyrolysis conditions may be made more drastic, utilizing higher pressures and temperatures and longer times or both and catalytic conditions selected in the lower pH range.

The phenolic resin, preferably an alkali-catalyzed liquid resin, which can be conveniently withdrawn directly from the reaction kettle, is added to macerated, moisture containing lignin-fiber in a Banbury mixer with great economy of effort compared with the conventional methods of mixing.

After a short period of mixing, the resin-fiber meal may be extruded one or more times through die plates of decreasing hole-diameter from about 3/8 down to 1/16 inch diameter to further mix and consolidate the ingredients. In this operation as in the Banbury mixer, the moisture content is valuable both as a lubricant and as a cooling agent. The evaporation of water prevents local overheating of the mass. The extruded material is dried at a relatively low temperature, as by vacuum or by tumbling in a stream of slightly warmed air to standard moisture content for molding powder, say about 2.5–6.0 percent, and reduced to proper molding powder size as by hammer mill.

Molding powders prepared in accordance with the foregoing teachings are characterized by high heat stability, high alkali resistance, high abrasion resistance and low water absorption compared with phenolic resins to which no lignin has been added. Whereas lignin prepared by former processes tended to depreciate such qualities when added to phenolic resins, the lignin prepared by the disclosed process improves molding powders as stated. The old lignins caused molded products to have poor electrical properties because of water absorption whereas my product is superior. Even conventional phenolic resins show poor performance in hot alkaline synthetic detergent solutions tending to become soft and cheesy whereas the addition of lignins, made in accordance with this process, improves phenolic molding powders.

Since the lignin used contains phenolic groups with a capacity for accepting methylol, I prefer to use a phenolic resin having a relatively high methylol content. Where approximately equal proportions of lignin and phenolic resin are employed, a phenolic resin containing 1.8 methylol groups per phenol gives satisfactory results. Where the ratio of lignin to phenolic plastic is 4:1, phenolic resin of 2.4:1 methylol ratio is satisfactory. Ideal ratios for other proportions can be computed from these figures. Alternatively, if a lower ratio phenolic resin is used, the deficit in methylol content can be made up with hexamethylene tetramine. It will be obvious that other phenolic type resins such as those containing substituted phenols or furfural instead of formaldehyde, can be used with results essentially predictable upon the basis of their relationship to straight phenol-formaldehyde resins.

Admixtures of acrylo-nitrile rubber are compatible and desirable for lending softness, toughness and promotion of flow.

It appears that, as the lignin and phenolic resin are admixed together under relatively mild heating conditions, well below the boiling point of water, they enter into mutual solution and as this takes place, the lignin is protected from further atmospheric oxidation.

Screened lignin-fiber mass, either with or without thickening, may be utilized as a base or as an addition agent for the production of laminating stocks. For such applications the longer fibered, alkaline catalyzed hydropyrolysis product is especially advantageous since the hydropyrolysis reaction may be controlled to yield fibers comparable in length to the unbleached kraft commonly employed in this art. The aqueous suspension of lignin-fiber is transferred to a mixing tank, where it may be mixed with additional lignin derived from a collateral process wherein a portion of the lignin is separated from the fiber; liquid phenolic resins, mold lubricants, coloring materials, elastomers such as acrylo-nitrile synthetic rubbers and other fibers. Further mixing may take place in conventional paper mill apparatus such as a beater. The mixture is delivered to a head box for metering its flow to the wet end of a cylinder or Fourdrinier paper machine or a continuous filter.

The product is constituted of such inexpensive ingredients as to be employed for the making of hardboard. In such case, the wet felted strip coming from the machine may be pressed hydraulically to produce a conventional hardboard. Or the strip, since it includes relatively finer fibers, of pulping quality, may be used to face a wet blanket of coarser fibers, carrying some binder material, to form a composite board of superior quality. The felt from the machine may be further dried to a moisture content of the order of 30 to 40 percent, in which state it is suitable for use in the formation of pulp-resin articles, which may then be pressed to final shape in a compression mold.

Further drying of the wet sheet to air dry conditions, with a normal moisture level of about 4 to 8 percent yields laminating stocks, molding boards, battery separators, electrical insulation, overlay papers, structural papers, gasket paper and an almost unlimited number of other sheet form materials, according to the blend of ingredients supplied to the mixer.

Blends containing phenolic resins and acrylo-nitrile elastomers are particularly desirable where toughness and abrasion resistance are sought after such as sheet materials to be used for gaskets and artificial leathers. Other suitable elastomeric modifiers are natural rubber, neoprene, GRS Type II and vinyl polymers.

It has been pointed out that previous efforts have been made to utilize wood derived lignin to extend or replace phenolic resins. Some investigators have proposed retention of a part of the fibrous nature of the cellulose fraction of the wood while modifying the lignin. Although it is conceded that additional resinous substances may be employed, the emphasis is placed upon products wherein the original wood supplies substantially all of both the resin and filler constituents. Less drastic hydropyrolysis conditions than those herein disclosed are characteristic. Washing to remove electrolytes is frequently overlooked. Nowhere is it recognized that reduction of moisture content of the hydropyrolysis product below 15% deteriorates the quality of the lignin, unless the water is replaced with another protective agent such as phenolic resin.

In other cases, conditions have been selected to substantially destroy all the fiber content of the original wood but sufficient care has not been exercised to avoid conversion of the fiber into products so severely degraded that only the lignin remains of value. Such processes merely waste the cellulose whereas conventional papermaking processes waste the lignin. Neither do these processes recognize the harm done by drying the lignin product.

Still other processes endeavor to recover lignin from papermaking waste products. I have found that the changes brought about in the paper-making process, so alter the nature of the lignin as to render it unsuited for making molding compounds suited to modern standards.

It is plainly evident that all the foregoing processes, including my own, drastically modify the chemical and physical nature of the lignin content of the wood, beyond the possibility of its return to its former state. Further, the changes brought about differ from one process to another so that, although the name "lignin" is applied to various intermediate and end products derived from substantially similar ligno-cellulose raw materials, such products are widely dissimilar. Existing analytical procedures do no more than point to possible ultimate structure and serve only to catalog observed characteristics. Hence reference to a lignin product without inclusion of the process by which it is derived affords little definite information about its nature.

I claim:

1. A process for producing compounds, thermosetting under heat and pressure comprising obtaining lignocellulose material in chip or particle form, establishing in the chips reagents which, under reaction conditions, will yield 0.3 percent (based on dry wood) of an electrolyte at least .01 ionized at 0.1 N concentration, subjecting the moist wood chips to a hydropyrolysis reaction, in the absence of added liquid by contacting the chips with steam at pressures of 600 to 1260 p.s.i. and the corresponding temperatures for times of 10 minutes to 20 seconds, abruptly terminating the reaction by reducing the pressure and temperature, washing the product to remove soluble substances and blending the reaction product with at least 2 percent of a first-stage thermosetting phenolic resin, while maintaining at least 15 percent water content in the reaction product from its discharge from the reaction chamber until its blending with the phenolic resin.

2. The process of claim 1 wherein there is added to the chips before hydropyrolysis sufficient acid to establish a pH of 5.5 before treatment and 4.0 after treatment.

3. The process of claim 1 wherein there is added to the chips before hydropyrolysis at least one reagent selected from the class of neutral salts and alkalis, in sufficient amount to establish a pH between 5.0 and 7.0 after treatment.

4. The process of claim 1 wherein there is added to the chips before hydropyrolysis, sufficient amounts of a reagent selected from the class of acids, bases and strongly ionized salts to combine with the acid-forming constituents and ash-content of the wood to yield a hydropyrolysis product of pH 5 or less.

5. The process of claim 1 wherein there is added to the hydropyrolysis product, sufficient water to form a pumpable slurry.

6. The process of claim 5 wherein acid is added to the water to prevent substantial loss of the ligneous fraction of the hydropyrolysis product by solution.

7. The process of claim 1 wherein the hydropyrolysis product is washed to an ash content of no more than 1 percent.

8. The process of claim 1 wherein the hydropyrolysis product is washed on a filter.

9. The process of claim 1 wherein the hydropyrolysis product is washed by gravity displacement.

10. The process of claim 1 wherein the hydropyrolysis product is screened, to remove coarse particles.

11. The process of claim 1 wherein the washed hydropyrolysis product is blended with at least 10 percent phenolic resin by malaxation.

12. The process of claim 11 wherein the blending operation includes the addition of other conventional molding powder ingredients and the blended product dried and reduced to particles suitable for use as molding powder.

13. The process of claim 11 wherein the phenolic resin has at least 1.8 methylol groups per phenol ring.

14. The process of claim 11 wherein the phenolic resin has at least 2.4 methylol groups per phenol ring.

15. The process of claim 1 wherein the phenolic resin is blended with the washed hydropyrolysis product while said product is suspended in water.

16. The process of claim 15 wherein the blended mixture is formed into a felted sheet.

References Cited in the file of this patent

UNITED STATES PATENTS

| | | |
|---|---|---|
| 2,036,156 | Lundback | Mar. 31, 1936 |
| 2,080,078 | Mason et al. | May 11, 1937 |
| 2,224,135 | Boehm | Dec. 10, 1940 |
| 2,234,188 | Morgan et al. | Mar. 11, 1941 |
| 2,516,847 | Boehm | Aug. 1, 1950 |
| 2,643,186 | Tower | June 23, 1953 |
| 2,645,577 | Bate et al. | July 14, 1953 |
| 2,964,518 | Snyder | Dec. 13, 1960 |